United States Patent
Lee et al.

(10) Patent No.: US 12,302,479 B2
(45) Date of Patent: May 13, 2025

(54) WIRELESS POWER TRANSMISSION APPARATUS FOR INDUCTION HEATING AND CONTROL METHOD THEREOF

(71) Applicant: LG Electronics Inc., Seoul (KR)

(72) Inventors: Jaewoo Lee, Seoul (KR); Euisung Kim, Seoul (KR); Hojae Seong, Seoul (KR)

(73) Assignee: LG Electronics Inc., Seoul (KR)

(*) Notice: Subject to any disclaimer, the term of this patent is extended or adjusted under 35 U.S.C. 154(b) by 866 days.

(21) Appl. No.: 17/185,626

(22) Filed: Feb. 25, 2021

(65) Prior Publication Data
US 2021/0274604 A1    Sep. 2, 2021

(30) Foreign Application Priority Data
Feb. 27, 2020 (KR) .................. 10-2020-0024269

(51) Int. Cl.
*H05B 6/06* (2006.01)
*A47J 43/046* (2006.01)
(Continued)

(52) U.S. Cl.
CPC .............. *H05B 6/065* (2013.01); *H02J 50/12* (2016.02); *H02J 50/60* (2016.02); *H02J 50/80* (2016.02);
(Continued)

(58) Field of Classification Search
CPC .. H02J 50/90; H02J 50/80; H02J 50/12; H02J 50/60; H05B 6/10; H05B 6/065; H05B 6/44; H05B 6/12; A47J 43/046
See application file for complete search history.

(56) References Cited

U.S. PATENT DOCUMENTS

| 4,996,405 A | 2/1991 | Pourney et al. |
| 2011/0132899 A1* | 6/2011 | Shimomugi ............ H02M 7/06 363/126 |

(Continued)

FOREIGN PATENT DOCUMENTS

| KR | 10-2017-0107516 A | 9/2017 | |
| KR | 10-2019-0043985 A | 4/2019 | |
| WO | WO-2013094174 A1 * | 6/2013 | .............. H02J 5/005 |

OTHER PUBLICATIONS

Fanpeng Kong, Coil misalignment compensation techniques for wireless power transfer links in biomedical implants. Oct. 2015, Rutgers. (Year: 2015).*

(Continued)

*Primary Examiner* — Steven W Crabb
*Assistant Examiner* — Spencer H. Kirkwood
(74) *Attorney, Agent, or Firm* — Fish & Richardson P.C.

(57) ABSTRACT

A wireless power transmission apparatus for induction heating includes: a working coil configured to change operation based on selection of a mode of operation from among a plurality of operating modes, the plurality of operating modes including a wireless power transmission mode configured to wirelessly transmit power and a heating mode configured to heat one or more objects, an inverter configured to output, to the working coil, current at an operation frequency, and a controller. The controller is configured to calculate an eccentricity degree between the working coil and a reception coil of a target object, and control, in the wireless power transmission mode, the operation frequency based on the calculated eccentricity degree while performing wireless power transmission to the target object.

15 Claims, 9 Drawing Sheets

(51) Int. Cl.
| | |
|---|---|
| *H02J 50/12* | (2016.01) |
| *H02J 50/60* | (2016.01) |
| *H02J 50/80* | (2016.01) |
| *H05B 6/12* | (2006.01) |
| *H05B 6/44* | (2006.01) |

(52) U.S. Cl.
CPC .............. *H05B 6/44* (2013.01); *A47J 43/046* (2013.01); *H05B 6/12* (2013.01)

(56) References Cited

U.S. PATENT DOCUMENTS

| | | | |
|---|---|---|---|
| 2011/0226756 A1* | 9/2011 | Arnal Valero | H05B 6/1209 219/622 |
| 2015/0341087 A1* | 11/2015 | Moore | H04B 1/40 455/77 |
| 2016/0218559 A1* | 7/2016 | Mehas | H02J 50/60 |
| 2019/0131824 A1* | 5/2019 | Suga | H05B 6/1236 |
| 2020/0212721 A1* | 7/2020 | Narayana Bhat | B60L 53/122 |

OTHER PUBLICATIONS

Mina Kim, Coil misalignment compensation algorithm for single-stage inductive wireless power transfer system using model-based approach. Apr. 19, 2018 (Year: 2018).*

Extended European Search Report in European Appln. No. 21159370.2, dated Jul. 23, 2021, 7 pages.

Office Action in Korean Appln. No. 10-2020-0024269, mailed on Jul. 26, 2024, 13 pages (with English translation).

* cited by examiner

WIRELESS POWER TRANSMISSION APPARATUS FOR INDUCTION HEATING AND CONTROL METHOD THEREOF

CROSS-REFERENCE TO THE RELATED APPLICATION

The present disclosure claims priority to and the benefit of Korean Patent Application No. 10-2020-0024269, filed on Feb. 27, 2020, in the Korean Intellectual Property Office, the disclosure of which is incorporated herein by reference in its entirety.

TECHNICAL FIELD

The present disclosure relates to a wireless power transmission apparatus, and more particularly, to a wireless power transmission apparatus for induction heating and a control method thereof.

BACKGROUND

Wireless charging refers to a method of charging a device by wirelessly transmitting power through the atmosphere instead of a method of charging a device by transmitting power through a wire.

According to the basic principle of wireless charging, when alternating current (AC) flows into a transmission coil, a battery is charged by forming a magnetic field around the transmission coil, allowing AC to flow in a reception coil due to influence of the magnetic field, and rectifying the AC.

Various small-size kitchen utensils are used in a kitchen, that is, small home appliances require power supply, and thus, the appliances receive power by connecting an electric cord (power connection cable) that is separately included in the appliances to a socket. In this case, there is a problem in that a plurality of electric cords adversely affects management, safety, or space utilization.

Thus, recently, the demand for wireless power charging of small home appliances used in a kitchen has rapidly increased.

For example, devices that need to be heated using induced current among the small home appliances have increasingly been spread.

Such a heating device using induced current uses an induction method of heating the device via electron induction by generating a magnetic field and is operated in the same way as an electric range.

For example, a general electron induction heating device allows high-frequency current to flow in a working coil or heating coil installed therein.

When the high-frequency current flows in the working coil or the heating coil, a strong line of magnetic force is generated. The line of magnetic force generated in the working coil or the heating coil forms eddy current while being transmitted through a cooking tool. Thus, as eddy current flows in a cooking tool, heat is generated to heat a container itself, and materials in the container are heated as the container is heated.

As such, there is the increasing demand for a multi-functional wireless power transmission device that is capable of performing induction heating or wireless charging depending on a type of the small home appliance.

The multi-functional wireless power transmission device is capable of performing induction heating or wireless power transmission by changing a frequency using one working coil or heating coil according to a mode selected by a user.

When induction heating or wireless power transfer is performed on a target small home appliance of a multi-functional wireless power transmission device, a reception and a working coil of the target small home appliance need to be aligned with each other.

That is, when the two coils that perform wireless power transfer are not aligned with each other and are eccentrically arranged, power transmission efficiency is remarkably lowered.

To this end, technologies of determining eccentricity and providing an alarm therefor or compensating for this in wireless power transfer are proposed.

For example, a conventional battery charging system for a vehicle through wireless power transfer is introduced, which discloses that information regarding a charging state of a reception side is received, and when a charging state value is less than a reference value, an alignment state is adjusted by moving a coil of the reception to achieve a constancy state.

However, for the conventional battery charging system, it is required to change the coil of the reception side for alignment. However, in the case of wireless power transfer of a small home appliance, it is required to continuously provide an alarm to a user to match a state of transmission/reception coils with constancy, and alignment state match is a factor that impedes use convenience of a wireless small home appliance.

A conventional device including a magnetic component at a reception side is introduced to solve such problem. For example, the magnetic component is automatically aligned with a transmission coil by allowing DC current to flow when an alignment state of transmission/reception coils is not matched in a wireless power transmission system.

As such, when a reception coil includes a magnetic component, a metallic foreign object may be attached thereto together, and thus, there is a risk of ignition or fuming due to a magnetic field generated during wireless power transfer.

In addition, it is also required to detect whether a foreign object is present between a target object and a working coil, to provide an alarm thereof, to remove the foreign object, and then to transmit power.

When a foreign object is present, there is a problem in terms of degradation in power transfer, and a risk of ignition depending on a material of a foreign object is inherent.

To this end, a technology including a separate snubber circuit whereby whether a foreign object is present is detected through current reduction is introduced.

In addition, a conventional device is introduced, which discloses that initial power, at a transmitter prior to wireless power transfer, is compared with original reference power when there is no foreign object, and whether a foreign object is present may be determined.

However, for the conventional device, a snubber circuit is further required to check a foreign object and a switch control and heat dissipation structure therefor is required. Thus, a space and costs are further needed.

Further, because initially transmitted power is compared with reference power, it is not possible to determine whether a foreign object is present during power transfer, and it is not possible to simultaneously determine whether a foreign object is present and whether eccentricity occurs, and thus, an eccentricity degree is not checked.

SUMMARY

According to one aspect of the subject matter described in this application, a wireless power transmission apparatus for induction heating includes a working coil configured to change operation based on selection of a mode of operation from among a plurality of operating modes, the plurality of operating modes including a wireless power transmission mode configured to wirelessly transmit power and a heating mode configured to heat one or more objects, an inverter configured to output, to the working coil, current at an operation frequency, and a controller. The controller can be configured to calculate an eccentricity degree between the working coil and a reception coil of a target object, and control, in the wireless power transmission mode, the operation frequency based on the calculated eccentricity degree while performing wireless power transmission to the target object.

Implementations according to this aspect can include one or more of the following features. For example, the controller can operate in a preparation period prior to a normal wireless power transmission mode configured to perform the wireless power transmission to the target object, and the determination of whether the target object includes the reception coil can be made in the preparation period.

In some implementations, the wireless power transmission apparatus can further include an upper glass arranged to receive the target object, and an input unit configured to receive the selection of the mode of operation. In some implementations, the controller can be configured to receive, from the target object, information regarding requested power while the operation frequency is set to a first operation frequency, and calculate input power of the working coil in response to the requested power.

In some examples, a standby voltage with predetermined amplitude can be maintained in the working coil based on the operation frequency being the first operation frequency. In some implementations, the controller can be configured to store data of input power and resonance current of the working coil based on an operation frequency of the inverter with respect to the eccentricity degree.

In some implementations, the controller can be configured to compare the stored data of input power with the calculated input power, and determine whether the working coil and the reception coil are aligned based on the comparison. In some examples, based on the coils being determined misaligned, the controller can be configured to determine whether there is an eccentricity degree having values of resonance current and input power at the operation frequency, which are matched with the calculated input power among stored data of eccentricity.

In some examples, based on the calculated input power and the stored data of eccentricity being different, the controller can be configured to determine that a foreign object is present in the working coil. In some implementations, based on the eccentricity degree increasing, the operation frequency can be lowered during the wireless power transmission.

According to another aspect of the subject matter described in this application, a method of operating a wireless power transmission apparatus for induction heating, which includes a working coil configured to change operation based on selection of a mode of operation from among a plurality of operating modes, the plurality of operating modes including a wireless power transmission mode configured to wirelessly transmit power and a heating mode configured to heat one or more objects, includes checking whether the wireless power transmission mode is selected, a preparation operation including (i) detecting a target object and (ii) determining whether the target object includes a reception coil, and a normal operation mode operation including calculating an eccentricity degree between the working coil and the reception coil of the target object and controlling, based on the wireless power transmission mode being selected, an operation frequency of an inverter for wireless power transmission depending on the calculated eccentricity degree.

Implementations according to this aspect can include one or more following features. For example, the preparation operation can include determining whether the target object includes the reception coil based on input current or resonance current.

In some implementations, the normal operation mode operation can include receiving, from the target object, information regarding requested power while the operation frequency is set to a first operation frequency, and calculating input power of the working coil in response to the requested power. In some examples, a standby voltage with predetermined amplitude can be maintained in the working coil based on the operation frequency being the first operation frequency.

In some implementations, the method can further include determining whether eccentricity occurs based on data of input power of the working coil and resonance current at an operation frequency of the inverter with respect to the eccentricity degree. In some examples, determining the eccentricity degree can include comparing data of input power with calculated input power, and determining whether the working coil and the reception coil are aligned based on the comparison.

In some examples, determining the eccentricity degree can include based on the coils being determined misaligned, determining whether there is an eccentricity degree having values of resonance current and input power at the operation frequency, which are matched with the calculated input power among data of eccentricity. In some implementations, the method can further include based on the calculated input power and the data of eccentricity being different, determining that a foreign object is present in the working coil.

In some implementations, based on the eccentricity degree increasing, the operation frequency can be lowered during the wireless power transmission. In some examples, the data eccentricity can be read from a look-up table and can be compared with the calculated input data.

DETAILED DESCRIPTION

Figure 1:
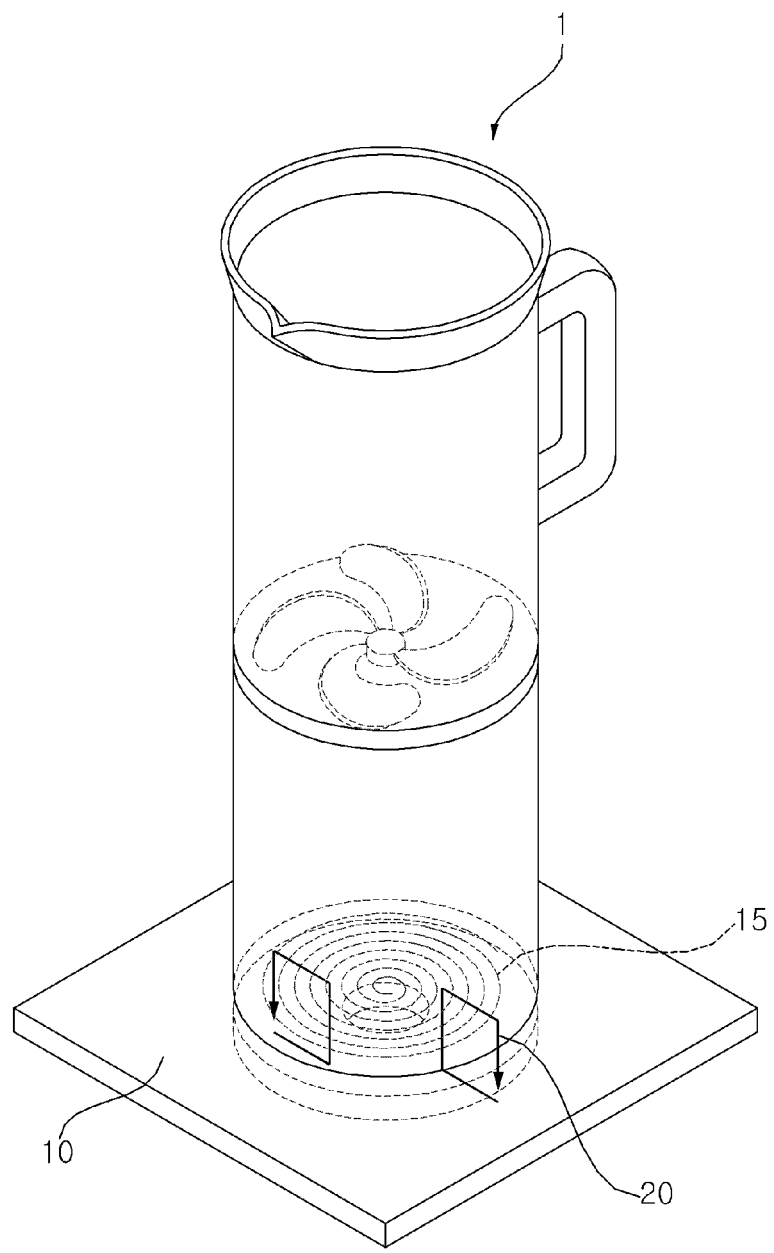
FIG. 1 is a diagram illustrating an upper perspective view of an exemplary wireless power transmission apparatus for induction heating.
Figure 2:
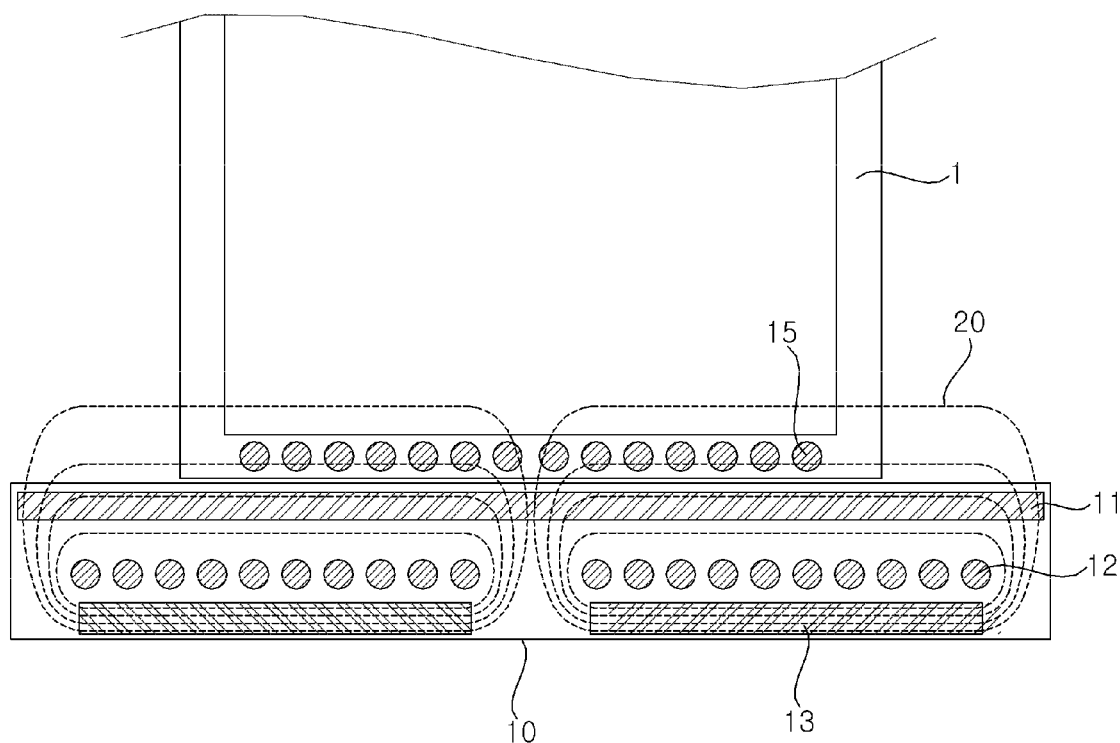
FIG. 2 is a diagram illustrating a cross-sectional view of the exemplary wireless power transmission apparatus for induction heating of FIG. 1.
Figure 3:
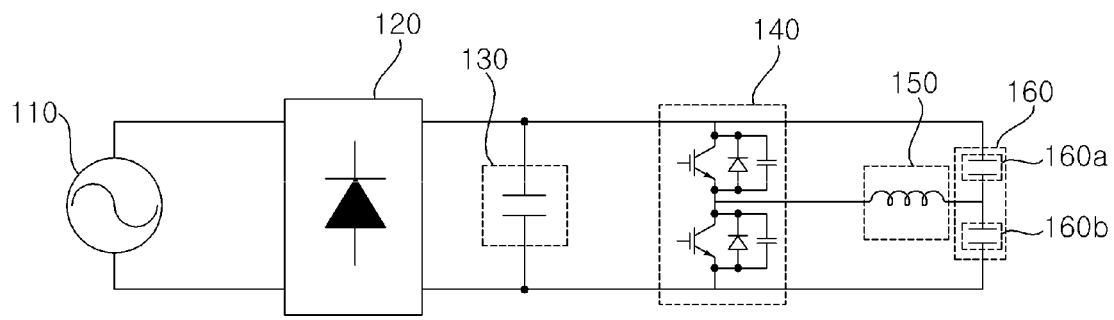
FIG. 3 is a circuit diagram for explaining an induction heating state.
Figure 4:
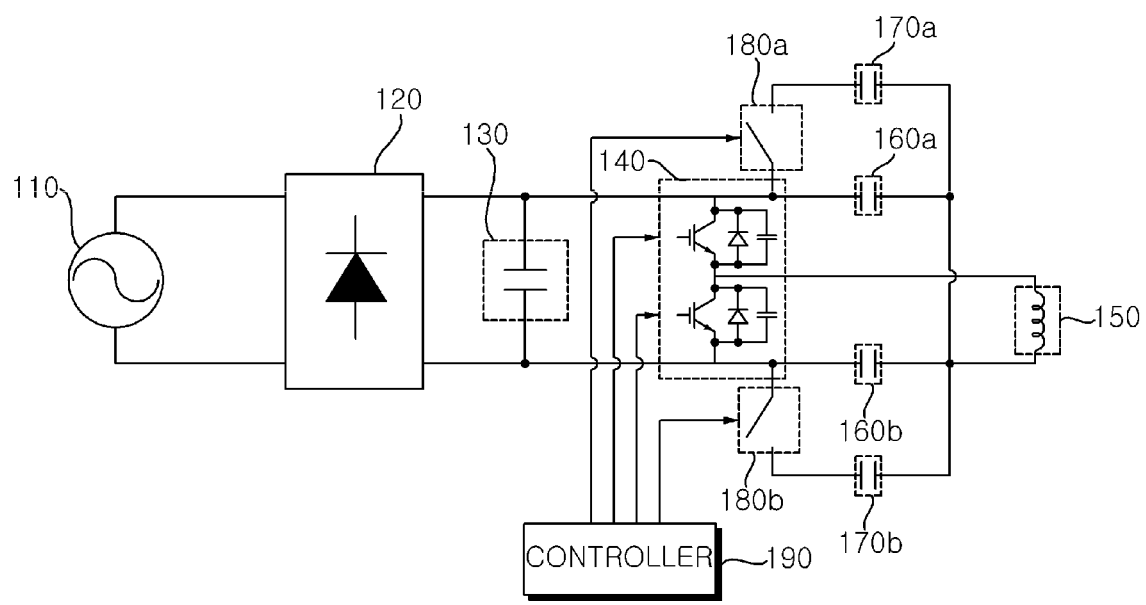
FIG. 4 is a circuit diagram for explaining wireless power transfer (WPT) of an exemplary wireless power transmission apparatus for induction heating.

FIG. 1 is a diagram illustrating an upper perspective view of an exemplary wireless power transmission apparatus 10 for induction heating. FIG. 2 is a diagram illustrating a cross-sectional view of the exemplary wireless power transmission apparatus 10 for induction heating of FIG. 1. FIG. 3 is a circuit diagram for explaining an induction heating state. FIG. 4 is a circuit diagram for explaining wireless power transfer (WPT) of the exemplary wireless power transmission apparatus 10 for induction heating.

Referring to FIGS. 1 and 2, a target object 1 can be positioned on a wireless power transmission apparatus 10. The wireless power transmission apparatus 10 can heat the target object 1 positioned thereon or can wirelessly transmit power to the target object 1.

The target object 1 can be a small home appliance having a reception coil 15, a small home appliance that does not have the reception coil 15, a general heating cooking container that is not an electronic product, or a foreign object.

The small home appliance having the reception coil 15 can wirelessly receive power using the reception coil 15 through the wireless power transmission apparatus 10 and can perform a main operation using the corresponding power. For example, the small home appliance can be a wireless blender or a wireless oven toaster.

The small home appliance that does not have the reception coil 15 can be a home appliance that is directly heated by generating a magnetic field through a working coil 12, which is a transmission coil of the wireless power transmission apparatus 10, and can be an electronic product that is not a general cooking container. An example thereof may be a wireless electric kettle or a wireless electric rice cooker. The small home appliance that does not have the reception coil 15 can include a pickup coil to supply power to a module that requires driving power from a region for performing a main operation, that is, a region except for a region that receives heat and performs a function. The pickup coil can be positioned away from a region corresponding to the working coil 12 that is a transmission coil, and can wirelessly receive power and can supply power to a module, for example, a control module such as a communication module, an interface, or a display.

The general cooking container may refer to a container including an electrical resistance component that can be heated by a magnetic field 20 generated from the working coil 12 and through which the magnetic field 20 passes. When a material of the cooking container includes an electrical resistance component, the magnetic field 20 can generate eddy current in the cooking container. The eddy current can heat the heating container, and the heat can be conducted and transmitted to an internal side of the cooking container. Thus, contents in the cooking container can be cooked.

When a foreign object is positioned at a position of the target object 1, the foreign object tends to be a material having an electrical resistance component that impedes wireless power transfer (WPT) and may be an iron bar such as a spoon or a chopstick.

The wireless power transmission apparatus 10 can function as an electronic induction heating apparatus or a wireless power transmission apparatus according to user's selection.

For example, the wireless power transmission apparatus 10 can function in an induction heating mode for heating a general heating container or can function in a wireless power transmission mode for wirelessly transmitting power to a small home appliance that has or does not have the reception coil 15 with respect to one working coil 12 according to the user's selection.

The multi-functional wireless power transmission apparatus 10 can include an upper glass 11 and a casing including at least on working coil 12, as shown in FIG. 2. First, components included in the wireless power transmission apparatus 10 will be described in detail.

The upper glass 11 can protect an internal part of the wireless power transmission apparatus 10 and can support the target object 1. For example, the upper glass 11 can be made of tempered glass of a ceramic material obtained by synthesizing various minerals. Thus, the upper glass 11 can protect an internal part of the wireless power transmission apparatus 10 from the outside. The upper glass 11 can support the target object 1 positioned thereon. Thus, the target object 1 can be positioned on the upper glass 11.

The working coil 12 can wirelessly transmit power to the target object 1 depending on the type of the target object 1 or a user mode selection, or can generate a magnetic field for heating, and at least one working coil 12 can be configured according to a design. In some implementations, a region in which the target object 1 is disposed can be determined depending on each coil 12.

A user input unit for determining a mode of the wireless power transmission apparatus can be disposed at one side of the upper glass 11.

For example, the working coil 12 can be disposed below the upper glass 11. Current may or may not flow in the working coil 12 depending on power on/off state of the wireless power transmission apparatus 10. When current flows in the working coil 12, the amount of current flowing in the working coil 12 can also vary depending on the mode and output of the wireless power transmission apparatus 10.

When current flows in the working coil 12, the working coil 12 can generate the magnetic field 20. As the amount of current flowing in the working coil 12 is increased, the generated magnetic field 20 can also increase.

A direction of the magnetic field 20 generated by the working coil 12 can be determined depending on a direction of the current flowing in the working coil 12. Thus, when alternating current (AC) flows in the working coil 12, the direction of the magnetic field 20 can be converted by a frequency of the AC. For example, when AC of 60 Hz flows in the working coil 12, the direction of the magnetic field can be converted 60 times per second.

A driving module that is electrically connected to the user input unit and the working coil 12, can receive a voltage and current from a commercially available power source, can convert the received voltage and current, and can supply power to the working coil 12 according to user input. In some implementations, the driving module can be disposed in the casing.

In some implementations, the driving module can be a plurality of chips installed on one printed circuit board. In some implementations, the driving module can be one integrated chip.

The wireless power transmission apparatus 10 can include ferrite 13 that can protect the driving module.

For example, the ferrite 13 can function as a shield that blocks influence of the magnetic field generated by the working coil 12 or an electromagnetic field generated outside of the working coil 12 on the driving module in the wireless power transmission apparatus 10.

To this end, the ferrite 13 can be made of a material with very high permeability. The ferrite 13 can guide the magnetic field introduced into the wireless power transmission apparatus 10 to flow through the ferrite 13 rather than being discharged.

In some implementations, the wireless power transmission apparatus 10 can include at least one working coil 12. In some implementations, the wireless power transmission apparatus 10 can include more than one working coils 12.

The respective working coils 12 can have different sizes, and current of specific frequency can flow in each working coil 12 through inverter-driving under control of the driving module, and thus, in the induction heating mode, target power corresponding to a firepower level selected by a user can be generated and heat corresponding to the target power can be generated.

In the wireless power transmission mode, current of different frequencies can flow through inverter-driving under control of the driving module, and thus, power can be wirelessly transmitted to a small home appliance.

To this end, the respective working coils 12 can be connected to inverters in the driving module, and the plurality of working coils 12 can be connected in parallel or series to each other by a switch and can be connected to an inverter.

When the corresponding wireless power transmission apparatus 10 is operated in the induction heating mode according to user selection, a magnetic field can be generated by current of a predetermined frequency and can be transmitted through a heating container positioned on the upper glass 11.

In some implementations, when an electrical resistance component is included in a material of a cooking container, the magnetic field can generate eddy current in the cooking container. The eddy current can heat the cooking container, and the heat can be conducted and transmitted to an internal side of the cooking container. Thus, the induction heating mode can proceed in a method of cooking contents in the cooking container.

Movement of the magnetic field generated in the working coil 12 by the ferrite 13 is shown in FIG. 2.

With reference to a circuit diagram in which the wireless power transmission apparatus 10 is operated in the induction heating mode, the wireless power transmission apparatus 10 can have a structure shown in FIG. 3.

For example, FIG. 3 is a circuit diagram of a wireless power transmission apparatus in an electromagnetic induction heating mode when the wireless power transmission apparatus includes an inverter 140 and an working coil 12 (hereinafter, referred to as 150). The wireless power transmission apparatus 10 in the electromagnetic induction heating mode can include a rectifier 120, a direct current (DC) link capacitor 130, an inverter 140, the working coil 12 (150), and a resonance capacitor 160.

An external power source 110 can be an alternating current (AC) input power source. The external power source 110 can supply AC power to an electromagnetic induction heating cooking device. For example, the external power source 110 can supply AC voltage to the rectifier 120 of the electromagnetic induction heating cooking device.

The rectifier 120 can be an electrical circuit for converting AC into DC and can convert AC voltage supplied through the external power source 110 into DC voltage. In some implementations, opposite ends of DC output through the rectifier 120 can refer to DC links. A voltage measured at the DC opposite ends can refer to a DC link voltage. When a resonance curve is not changed, output power can be varied depending on a DC link voltage. The DC link capacitor 130 can function as a buffer between the external power source 110 and the inverter 140. For example, the DC link capacitor 130 can maintain the DC link voltage converted through the rectifier 120 and can supply the voltage to the inverter 140.

The inverter 140 can switch a voltage applied to the working coil 12 (150) and can allow high-frequency current to flow in the working coil 12 (150). For example, the inverter 140 can drive a switching device including an insulated gate bipolar transistor (IGBT) and can allow high-frequency current to flow in the working coil 12 (150), and thus, a high-frequency magnetic field can be formed in the working coil 12 (150).

Current may or may not flow in the working coil 12 (150) according to whether the switching device is driven. For example, when current flows in the working coil 12 (150), a magnetic field can be generated. As current flows in the working coil 12 (150), a magnetic field can be generated to heat a cooking container.

As such, in the electromagnetic induction heating mode, the wireless power transmission apparatus 10 can heat the cooking container using the working coil 12 (150) in electromagnetic induction.

When the wireless power transmission apparatus 10 functions in a wireless power transmission mode, the working coil 12 (150) used in inductive heating can be used in wireless power transfer (WPT) in the same way.

Wireless power transfer (WPT) refers to technology of transmitting power without wire. A method used in wireless power transfer (WPT) can include a magnetic induction (MI) method or a magnetic resonance (MR) method. The magnetic induction (MI) method can use a magnetic induction phenomenon between a primary coil and a secondary coil. For example, when current is injected into a primary (transmission) coil, a magnetic field can be generated. Induced current can be generated in the secondary (reception) coil by the magnetic field generated in the primary coil. The induced current generated in the secondary coil can charge a battery. The magnetic field generated using a magnetic induction method may be weak, and thus, the primary coil and the secondary coil need to be positioned adjacent to each other in order to charge the battery.

The magnetic resonance (MR) method is a method in which primary and secondary coils transmit and receive power using the same frequency. For example, when a magnetic field that oscillates at a resonance frequency is generated in the primary coil, the secondary coil can be designed at the same resonance frequency as the magnetic field generated in the primary coil and can receive energy. In some implementations, it can be possible to charge the battery at a relatively long distance.

As such, a corresponding function can be selectively performed according to user mode selection using the same structure by using a coil used in wireless power transfer (WPT) as the working coil 12 used in the induction heating mode.

Referring back to FIG. 3, one side of the working coil 12 (150) can be connected to a node of a switching device of the inverter 140, and the other side of the working coil 12 (150) can be connected to the resonance capacitor 160. The switching device can be driven by a controller 190 (see FIG. 4) and can be controlled according to a switching time output from the controller 190, and as the switching device is alternately operated, a high-frequency voltage can be applied to the working coil 12 (150). An on/off time of the switching device applied from the controller 190 can be controlled to be gradually compensated for, and thus, a voltage applied to the working coil 12 (150) can be changed to a high voltage from a low voltage.

The controller 190 can control an overall operation of the wireless power transmission apparatus 10. For example, the controller 190 can control each component included in the wireless power transmission apparatus 10. The resonance capacitor 160 can be a component that functions as a buffer. The resonance capacitor 160 can adjust a saturation voltage increase rate while the switching device is turned off and can affect energy loss during a turn-off time. The resonance capacitor 160 can include a plurality of capacitors 160a and 160b that are connected in series to each other between the working coil 12 (150) and the DC opposite ends to which a voltage from the rectifier 120 is output. The resonance capacitor 160 can include a first resonance capacitor 160a and a second resonance capacitor 160b. For example, a first end of the first resonance capacitor 160a can be connected to a first end to which a voltage from the rectifier 120 is output, and a second end can be connected to a node of the working coil 12 (150) and the second resonance capacitor 160b. Similarly, a first end of the second resonance capacitor 160b can be connected to the second end to which a low voltage is output from the rectifier 120, and a second end can be connected to the node of the working coil 12 (150) and the first resonance capacitor 160a.

Capacitance of the first resonance capacitor 160a can be the same as capacitance of the second resonance capacitor 160b.

Depending on capacitance of the resonance capacitor 160, a resonance frequency of the wireless power transmission apparatus 10 can be determined.

For example, the resonance frequency of the wireless power transmission apparatus 10 configured as the circuit diagram shown in FIG. 3 can be determined depending on inductance of the working coil 12 (150) and capacitance of the resonance capacitor 160. A resonance curve can be formed based on the resonance frequency determined depending on the inductance of the working coil 12 (150) and the capacitance of the resonance capacitor 160. The resonance curve can represent output power depending on a frequency.

A quality (Q) factor can be determined depending on an inductance value of the working coil 12 (150) included in the multi-functional wireless power transmission apparatus 10 and a capacitance value of the resonance capacitor 160. The resonance curve can be differently formed depending on the Q factor. A frequency at which maximum power is output can refer to a resonance frequency (f0), and the wireless power transmission apparatus can use a frequency of a right region based on the resonance frequency (f0) of the resonance curve. Thus, the wireless power transmission apparatus 10 can reduce a frequency to lower a firepower stage and can increase the frequency to increase the firepower stage. The wireless power transmission apparatus 10 can adjust such a frequency and can adjust output power. The wireless power transmission apparatus 10 can use a frequency corresponding to a range to a second frequency from a first frequency. For example, the wireless power transmission apparatus can change a current frequency to any one frequency included in the range to the second frequency from the first frequency and can adjust firepower. The first frequency as a minimum frequency and the second frequency as a maximum frequency that are to be controlled by the wireless power transmission apparatus 10 can be preset. For example, the first frequency can be 20 kHz and the second frequency can be 75 kHz.

As the first frequency is set as 20 kHz, the wireless power transmission apparatus 10 can limit the case in which an audible frequency (about 16 Hz to 20 kHz) is used. Thus, noise of the wireless power transmission apparatus 10 cab be reduced. In some implementations, the second frequency can be set to an IGBT maximum switching frequency. The IGBT maximum switching frequency can refer to a maximum frequency for driving in consideration of internal pressure, capacitance, and the like of the IGBT switching device. For example, the IGBT maximum switching frequency can be 75 kHz.

As such, a frequency that is generally used to heat a cooking took by induction heating in the wireless power transmission apparatus 10 can be between 20 kHz to 75 kHz.

A frequency used in wireless power transfer (WPT) can be different from a frequency used for induction heating the cooking container by the wireless power transmission apparatus 10. For example, the frequency used in wireless power transfer (WPT) can be a frequency with a higher band than a frequency used to heat a cooking container by the wireless power transmission apparatus.

Thus, the wireless power transmission apparatus can provide both a cooking tool heating function and a wireless power transfer (WPT) function through the same working coil 12 (150) by adjusting a resonance frequency.

FIG. 4 is an example of a circuit diagram of the case in which a wireless power transmission apparatus is operated in a wireless power transmission mode.

FIG. 4 shows an example of the wireless power transmission apparatus 10 that selectively provides a cooking container induction heating mode and a wireless power transmission mode.

The wireless power transmission apparatus 10 can include the rectifier 120, the DC link capacitor 130, the inverter 140, the working coil 12 (150), the resonance capacitors 160a and 160b, WPT capacitors 170a and 170b, and mode conversion switches 180a and 180b.

The same description as the description given with reference to FIG. 3 is omitted here.

The working coil 12 (150) can generate a magnetic field as current flows therein. In some implementations, the magnetic field generated in the working coil 12 (150) can heat the target object 1 of a secondary side as being transmitted through the cooking container of the secondary side.

In some implementations, the magnetic field generated by the working coil 12 (150) can transmit power to a small home appliance of the secondary side as being transmitted through the small home appliance of the secondary side.

The resonance capacitors 160a and 160b can be the same as in the description given with reference to FIG. 3. That is, the resonance capacitors 160a and 160b shown in FIG. 4 can be the same as the resonance capacitor included in the wireless power transmission apparatus 10 as described above with reference to FIG. 3.

As the wireless power transmission apparatus 10 is operated in a wireless power transmission mode or a cooking container induction heating mode, the resonance capacitors 160a and 160b may or may not be connected in parallel to the WPT capacitors 170a and 170b.

In some implementations, the WPT capacitors 170a and 170b can be connected in parallel to the resonance capacitors 160a and 160b. The WPT capacitors 170a and 170b can be a component for lowering a resonance frequency of the wireless power transfer (WPT) to operate an electromagnetic induction heating cooking device 100 in the wireless power transmission mode. For example, when the wireless power transmission apparatus 10 is operated in the cooking container induction heating mode, the WPT capacitors 170*a* and 170*b* may not be connected to the resonance capacitors 160*a* and 160*b*. By way of further example, when the wireless power transmission apparatus 10 is operated in the wireless power transmission mode, the WPT capacitors 170*a* and 170*b* can be connected in parallel to the resonance capacitors 160*a* and 160*b*. When the WPT capacitors 170*a* and 170*b* are connected in parallel to the resonance capacitors 160*a* and 160*b*, composite capacitance can increase. When the composite capacitance increases, the resonance frequency (f0) can be reduced.

For example, when the electromagnetic induction heating cooking device 100 is operated in the wireless power transmission mode, the resonance frequency (f0) can be reduced. As such, the wireless power transmission apparatus 10 can reduce the resonance frequency (f0) and can wirelessly transmit power to a product of a secondary side using the original inverter 140 and working coil 12 (150).

The WPT capacitors 170*a* and 170*b* can include the first WPT capacitor 170*a* and the second WPT capacitor 170*b*. In some implementations, the first WPT capacitor 170*a* can be connected in parallel to the first resonance capacitor 160*a*, and the second WPT capacitor 170*b* can be connected in parallel to the second resonance capacitor 160*b*.

Capacitance of the first WPT capacitor 170*a* can be the same as capacitance of the second WPT capacitor 170*b*.

The mode conversion switches 180*a* and 180*b* can determine whether the WPT capacitors 170*a* and 170*b* and the resonance capacitors 160*a* and 160*b* are connected in parallel to each other. For example, the mode conversion switches 180*a* and 180*b* can perform control to connect or not connect the WPT capacitors 170*a* and 170*b* in parallel to the resonance capacitors 160*a* and 160*b*.

For example, when the mode conversion switches 180*a* and 180*b* are turned on, a circuit can be shorted, and the WPT capacitors 170*a* and 170*b* and the resonance capacitors 160*a* and 160*b* can be connected in parallel to each other. Thus, as described above, the resonance frequency (f0) can be reduced.

In some implementations, when the mode conversion switches 180*a* and 180*b* are turned off, the circuit can be open, and the WPT capacitors 170*a* and 170*b* may not be connected to the resonance capacitors 160*a* and 160*b*. Thus, the resonance frequency (f0) may not be changed.

The mode conversion switches 180*a* and 180*b* can include the first mode conversion switch 180*a* and the second mode conversion switch 180*b*, and the first mode conversion switch 180*a* and the second mode conversion switch 180*b* can be simultaneously operated. The first mode conversion switch 180*a* can determine whether the first WPT capacitor 170*a* and the first resonance capacitor 160*a* are connected in parallel to each other, and the second mode conversion switch 180*b* can determine whether the second WPT capacitor 170*b* and the second resonance capacitor 160*b* are connected in parallel to each other.

In some implementations, the mode conversion switches 180*a* and 180*b* can be controlled depending on an operation mode, and can be operated in the wireless power transmission mode or the induction heating mode through the same working coil 12 (150).

For example, one mode of the two modes can be selectively operated through a user input unit according to user selection.

The wireless power transmission apparatus 10 can further include the controller 190 for controlling on and off of the conversion switches 180*a* and 180*b* depending on such mode selection, controlling on and off a switching device of the inverter 140, and controlling an overall operation of a driving module.

In some implementations, when the induction heating mode is selected using a user input unit, the controller 190 of the wireless power transmission apparatus 10 can be operated in the induction heating mode, and the conversion switches 180*a* and 180*b* can be turned off to perform induction heating.

In some implementations, when the wireless power transmission mode of the target object 1 is selected using the user input unit, the wireless power transmission apparatus 10 can be operated in the wireless power transmission mode, the conversion switches 180*a* and 180*b* can be turned on, and wireless power transfer (WPT) can be performed at a resonance frequency based on composite capacitance.

In some implementations, the wireless power transmission apparatus 10 needs to perform whether the target object 1 positioned on the upper glass 11 is capable of wirelessly transmitting power.

Even if a user selects the wireless power transmission mode through the user input unit, when the target object 1 positioned on the wireless power transmission apparatus is an electronic product that is not capable of performing wireless power transfer (WPT) or a small home appliance having no reception coil but not a small home appliance having a reception coil, the wireless power transmission apparatus 10 can differently perform the operation.

When the operation is performed based on only mode selection information received through the user input unit, overcurrent may flow in the target object 1 having no reception coil, or in the case of a foreign object, a waste of electricity may also be caused due to overcurrent and high heat may be accompanied, and thus, the apparatus may be damaged.

When the target object 1 is a small home appliance having the reception coil 15, an alignment state between the reception coil 15 and the working coil 12 may need to be determined.

When the reception coil 15 and the working coil 12 are not aligned with each other, that is, in the case of eccentricity, an operation frequency of wireless power transmission needs to be controlled to perform power transmission for which eccentricity is compensated.

Figure 5:
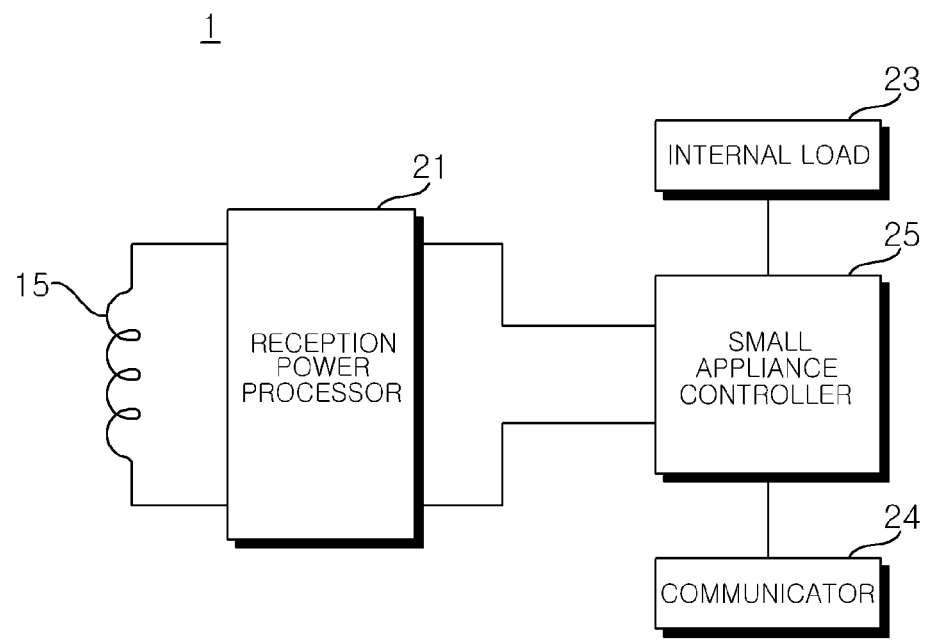
FIG. 5 is a diagram illustrating a configuration of a target object at a reception side.
Figure 6:
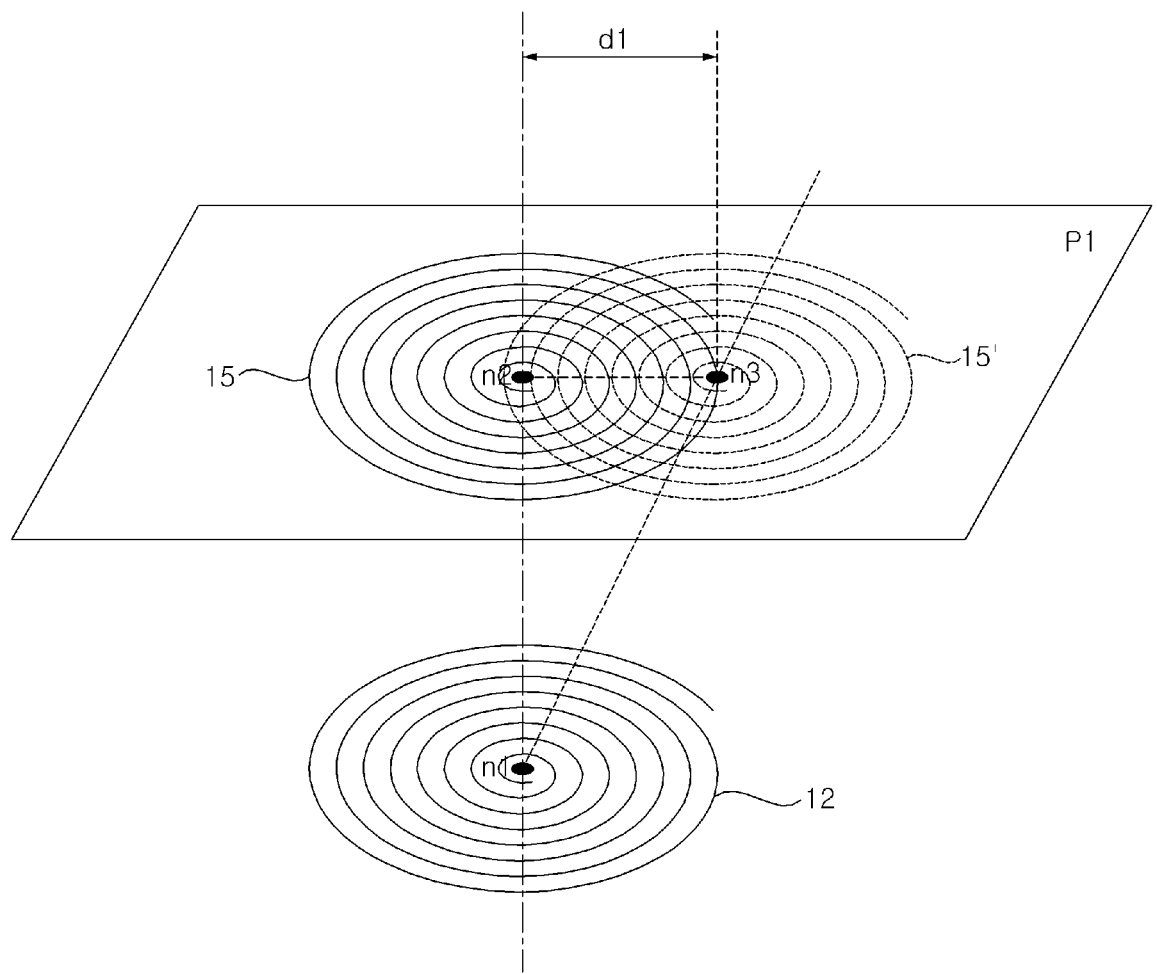
FIG. 6 is a state diagram illustrating an alignment state between a reception coil and a working coil.

In some implementations, a configuration of a reception side, that is, a target object can be, for example, the same as in FIG. 5, and an alignment state between the reception coil and the working coil of the target object can be shown in FIG. 6.

FIG. 5 is a diagram illustrating a configuration of a target object at a reception side. FIG. 6 is a state diagram illustrating an alignment state between a reception coil and a working coil.

Referring to FIG. 5, the target object 1, which can be a small home appliance having the reception coil 15, can include the reception coil 15, a reception power processor 21 connected to the reception coil 15 and configured to process received wireless power, a small appliance controller 25, an internal load 23, and a communicator 24.

For the small home appliance having the reception coil 15, the reception coil 15 can be disposed on a bottom surface or the like, can be formed to face the working coil 12, and can be configured to wirelessly receive power.

The small home appliance having the reception coil 15 can be a small home appliance including the internal load 23 as a functional block, such as a wireless oven toaster or a wireless blender, and can include the reception power processor 21 for wirelessly receiving power, converting corresponding power to a desired level, and providing the power to the internal load 23 with a desired function.

The reception power processor 21 can include a converter for rectifying current and voltage in the reception coil 15 and converting the rectified current and voltage to a desired level.

The communicator 24 can wirelessly communicate with the wireless power transmission apparatus 10 for induction heating, can transmit information regarding a load voltage, target output of the small home appliance, or the like, and can also transmit information regarding whether the internal load 23 is driven.

The small home appliance having the reception coil 15 can include the small appliance controller 25 for controlling the reception power processor 21, the internal load 23, and the communicator 24, and the small appliance controller 25 can control each functional block according to a command from an external user, that is, a command through a user interface or the like, and can supply power required by the internal load 23 to drive the internal load 23.

Thus, it can be possible to wirelessly supply power and to perform a desired function, and thus, power can be supplied from the wireless power transmission apparatus 10 without power supply by wire, the internal load 23 can be driven, and a function of a toaster, a blender, or the like can be performed.

When the small home appliance having the reception coil 15 is positioned on the upper glass 11, alignment between the reception coil 15 and the working coil 12 can proceed.

Alignment between the reception coil 15 and the working coil 12 can be defined based on whether the centers of the two coils 12 and 15 are positioned on the same axis.

For example, as schematically shown in FIG. 6, assuming that the central points n1 and n2 of the respective coils, that is, the central point n2 of the reception coil 15 and the central point n1 of the working coil 12 are positioned on the single plane, an eccentricity amount d1 can be defined as a straight distance between the two central points.

In some implementations, for wireless power transfer of a small home appliance having the reception coil 15, for example, a blender or an oven toaster, the reception coil 15 needs to be aligned with the working coil 12 at a short distance that satisfies a predetermined distance.

Alignment can be defined as constancy, that is, a state in which the two central points n1 and n2 are homocentric on the single plane assuming that the two coils 12 and 15 are positioned on the single plane P1, that is, a state in which the central point n2 of the reception coil 15 and the central point n1 of the working coil 12 are homocentric on an axis perpendicular to an imaginary single plane P1.

Eccentricity corresponds to the case in which central points n1 and n3 of the two coils 12 and 15 are not homocentric on the axis perpendicular to the imaginary single plane P1, and as shown in FIG. 6, a distance d1 between the two central points n2 and n3 on the imaginary single plane P1 can be defined as an eccentricity degree.

Thus, the eccentricity degree can be defined as the straight distance d1 on the imaginary single plane and may not be a diagonal distance on difference planes.

In some implementations, in order to smoothly perform wireless power transfer between the two coils 12 and 15, the eccentricity degree needs to be a predetermined range or less, and as the eccentricity degree is increased, transmission efficiency of wireless power transfer may be lowered.

Thus, the present disclosure proposes a method of determining an eccentricity degree, compensating for this, and wirelessly transmitting power during wireless power transfer.

Hereinafter, the whole operation of a wireless power transmission apparatus for induction heating will be described with reference to FIGS. 7 and 8.

Figure 7:
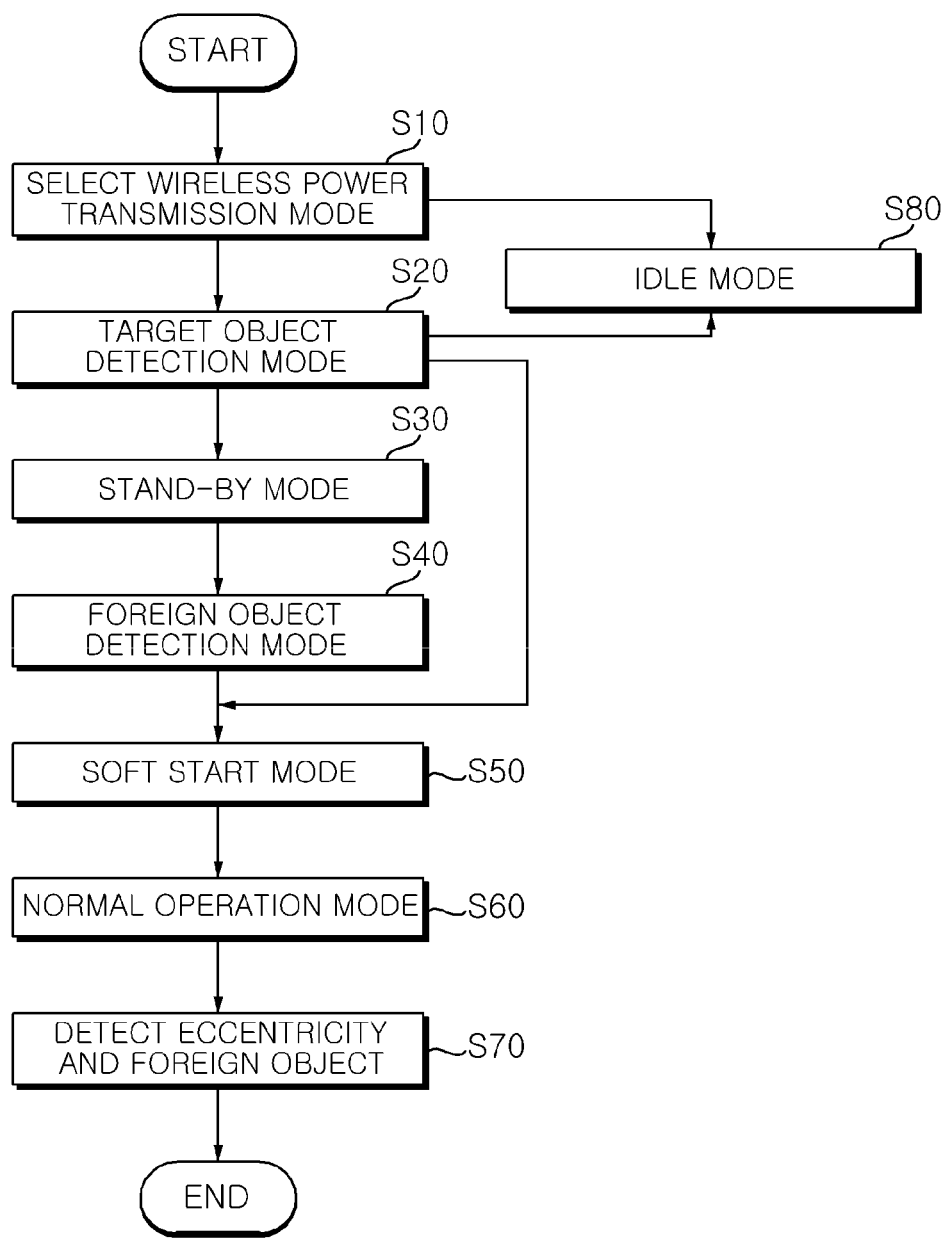
FIG. 7 is a schematic flowchart illustrating an exemplary process for a mode of a wireless power transmission apparatus for induction heating.

FIG. 7 is a schematic flowchart illustrating an exemplary process for a mode of a wireless power transmission apparatus for induction heating. FIG. 8 is a diagram illustrating a structure of a transmission apparatus and a reception apparatus with respect to the flowchart of FIG. 7.

Figure 8:
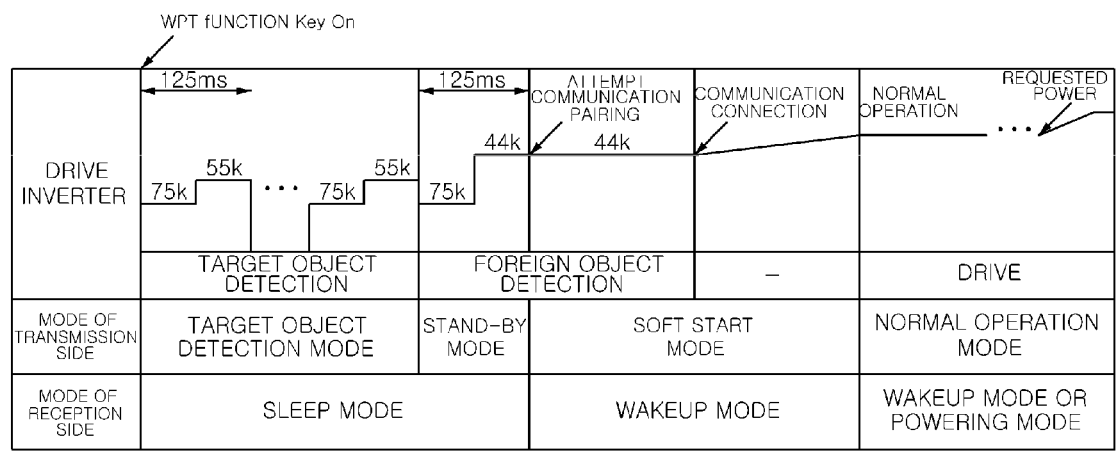
FIG. 8 is a diagram illustrating a structure of a transmission apparatus and a reception apparatus with respect to the flowchart of FIG. 7.

Referring to FIGS. 7 and 8, when the controller 190 receives selection information corresponding to selection of an icon or a button of a wireless power transmission mode by selecting the icon or the button from a user input unit, the wireless power transmission apparatus for induction heating can be converted into the wireless power transmission mode and can perform an operation.

The wireless power transmission apparatus 10 for induction heating can have a preparation period through a plurality of operations to a normal operation mode S60, that is, an operation of wirelessly emitting power towards the reception target object 1.

The wireless power transmission apparatus 10 for induction heating can perform detection for identifying the target object 1 positioned on the upper glass 11 in the preparation period prior to the normal operation mode.

For example, the target object 1 can be identified by determining whether the target object 1 is (i) a small home appliance having a reception coil, (ii) a small home appliance that is directly heated without a reception coil and has only a pick up coil, (iii) a general heating container, (iv) a foreign object, or (v) in a no-load state in which there is nothing.

For example, when receiving mode selection information (S10), the wireless power transmission apparatus 10 can enter a target object detection mode S20 in terms of a transmission side.

The wireless power transmission apparatus 10 defined as the transmission side can execute a foreign object detection mode S40 and a soft start mode S50 through a target object detection mode S20 and a stand-by mode S30.

In the soft start mode S50, prior to entry into the normal operation mode S60, detection of all the target objects 1 can be terminated and corresponding power can be wirelessly transmitted (S70).

The target object detection mode S20 can be simultaneously executed when a user pushes a wireless power transmission mode icon or button of a user input unit, and the controller 190 can oscillate frequencies for determining whether the target object 1 is positioned on the upper glass 11 and predicting an alignment state.

In some implementations, a switching device of the inverter 140 can be alternately turned on and off to allow current to flow according to the oscillation frequency. Whether the target object 1 identified in the target object detection mode S20 is a general heating container can be determined whether the target object 1 is a heating container can be determined while switching to a first operation frequency from a start frequency.

In the target object detection mode S20, whether the target object 1 is present and whether the target object 1 has a coil can be determined, and when the coil is present, whether the reception coil 15 and the working coil 12 of the target object 1 are aligned with each other, that is, whether the coils are positioned in constancy or eccentricity can be additionally determined.

In the target object detection mode S20, the wireless power transmission apparatus 10 can attempt wireless communication with the target object 1, and reception through wireless communication can be started by communication pairing when power of a small home appliance that is the target object 1 is supplied in the foreign object detection mode.

An idle mode can be defined as a start mode in which the controller 190 is activated by supplying power to a driving module including the controller 190 of the wireless power transmission apparatus 10 for induction heating when a user pushes and turns on a power button through a user input unit.

In the idle mode, wired communication between the user input unit and the driving module can be performed.

The stand-by mode S30 can be an operation after the target object detection mode S20, and can be defined as a frequency change period in which the inverter 140 is driven at a second operation frequency in order to determine a foreign object when the target object 1 is present in a region for wireless power transfer.

In some implementations, in the stand-by mode S30, frequency sweep can occur from an initial operation frequency to a second operation frequency, and when the second operation frequency is reached, a current mode can substantially enter the foreign object detection mode S40.

In some implementations, the second operation frequency may not oscillate from the beginning because oscillation needs to be sequentially induced since driving noise is generated when the apparatus is driven at the second operation frequency, that is, a lower frequency than the initial operation frequency in a state in which a voltage of a DC link is charged.

The foreign object detection mode S40 can be defined as a period in which induced voltage information of the target object is received and whether a foreign object is present in a state in which the apparatus is driven at the second operation frequency and communication pairing with a reception side, that is, the target object 1 is performed.

In some implementations, when the foreign object is determined to be present, the apparatus can enter the idle mode again and information indicating that the foreign object is present can be signaled to a user, and when there is no foreign object, the apparatus can enter the soft start mode S50.

For example, a state that is activated by injecting power into the reception side, that is, the target object 1 due to induced current from the foreign object detection mode S40 can be defined as a wakeup mode, and in this case, wireless communication is paired between the reception side and the transmission side and communication can begin therebetween.

The soft start mode S50 can be defined as a period in which power of a level requested by the target object 1 is changed to a frequency corresponding to corresponding power for an operation in the wireless power transmission apparatus 10.

When the power of the level requested by the target object 1 is approximately reached in the soft start mode S50, a current mode can enter the normal operation mode S60.

In the soft start mode S50, an additional detection mode can be executed.

The additional detection mode can be defined as a period in which additional detection is performed for recheck prior to power transfer of a small home appliance.

For example, in the additional detection mode, a mode that is actually selected by a user can be rechecked, and whether there is an error of judgment between no load and a small home appliance can be rechecked.

The normal operation mode S60 can be defined as a period in which change in requested output is monitored and whether there is a difference between actual output and the requested output is determined with a constant level at power of the level requested by the target object 1.

In some implementations, when there is the difference between the actual output and the requested output, if the actual output is lower than the requested output, a power up mode can proceed to lower an operation frequency and to increase output, and if the actual output is higher than the requested output, a power down mode can proceed to increase the operation frequency and to lower the output.

At a side of the target object 1, according to user operation selection and operation time of the target object 1 or according to request for low power or high power, the controller 190 can perform an operation using requested output based on the request.

As such, in some implementations, as the normal operation mode S60 is executed, whether eccentricity occurs and whether a foreign object is present can be detected (S70).

For example, in the normal operation mode S60, requested output can be received, and an operation frequency can be switched based on the requested output, and requested power can be received from a target object and can be analyzed, a power calculation value of the working coil 12 for the requested power can be calculated, and whether eccentricity occurs and a foreign object is present can be determined based on the power calculation value of the working coil 12.

Hereinafter, determination of eccentricity and a foreign object will be described in detail with reference to FIGS. 9 and 10.

Figure 9:
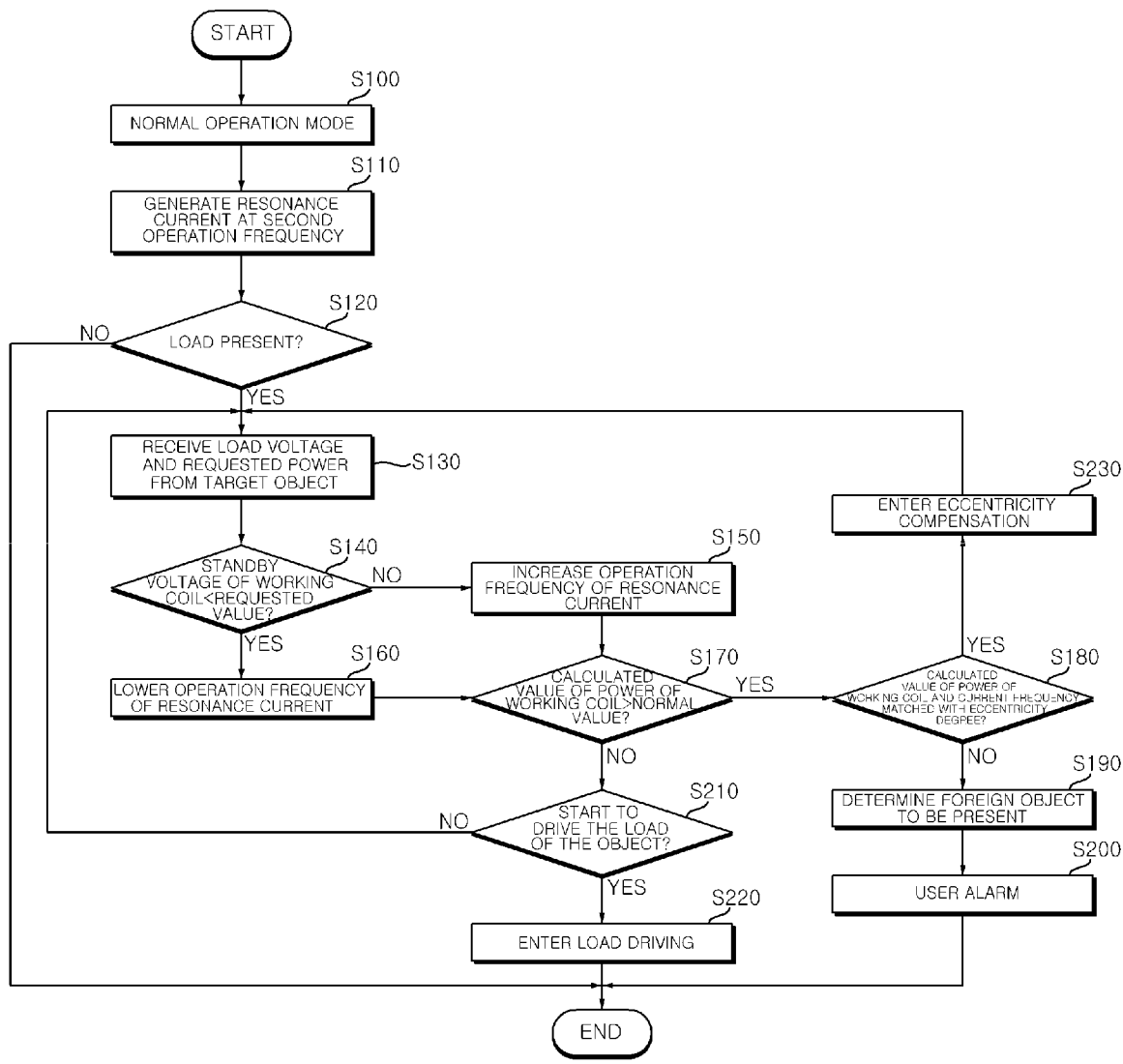
FIG. 9 is a flowchart illustrating an exemplary operation of determining eccentricity and a foreign object during power transfer.

FIG. 9 is a flowchart illustrating an exemplary operation of determining eccentricity and a foreign object during power transfer. FIG. 10 is a graph illustrating a compensation method based on eccentricity.

Referring to FIG. 9, a preparation period can be terminated and a normal operation mode S100 can be executed.

In the normal operation mode, when the target object 1 is determined to be a small home appliance having the reception coil 15, the inverter 140 can be driven at a second operation frequency for wirelessly transmitting power to the reception coil 15 (S110).

Thus, the inverter 140 of the wireless power transmission apparatus 10 for induction heating can turn on or off a switching device at a second operation frequency to allow current to flow, and thus, a standby voltage can be set in the working coil 12 and resonance current can flow therein.

In some implementations, the controller 190 can receive information on whether a load is present through wireless communication from the communicator 24 of a small home appliance that is the target object 1 (S120).

For example, the controller 190 can receive information regarding whether an operation request of the internal load 23 is present according to control of the internal load 23 such as an oven toaster or a blender of the small home appliance that is the target object 1.

As such, when there is requested power according to driving of the internal load 23, the controller 190 can receive information regarding load voltage and request power therefor (S130).

The load voltage and the request voltage can be different depending on each requested operation of the internal load 23, and power with different amplitudes can be requested depending on a level of each operation.

In some implementations, a standby voltage with predetermined amplitude for driving the internal load 23 of the target object 1 can be maintained in the working coil 12. As such, the standby voltage can be maintained in a predetermined level in the working coil 12, and thus, when the standby voltage is not maintained due to power variation, variation in an input voltage may also occur in the reception power processor 21 of the internal load 23 of the target object 1, thereby preventing a malfunction in which a minimum requested voltage is not maintained, or the case in which the internal load 23 is operated and then is stopped.

Thus, the working coil 12 can maintain the standby voltage with a predetermined amplitude or grater.

The controller 190 can calculate an input voltage value that needs to be set in the working coil 12 from requested power received from the communicator 24 of the target object 1.

Such an input voltage value can be calculated according to a relationship between combined inductance and input current of inductive power transmission.

The controller 190 can compare the calculated value of input voltage with the standby voltage (S140), and when the standby voltage is not lower than the calculated value of input voltage, an operation frequency for resonance current can be increased to increase input current, and thus, the corresponding input voltage value can be increased to the same level as the standby voltage (S150).

When a value of the standby voltage is lower than the calculated value of the input voltage, the operation frequency for the resonance current can be lowered to lower the input current, and thus, the corresponding input voltage value can be lowered to the same level as the standby voltage (S160).

Thus, the input voltage value based on the requested power can be changed to the same level as the standby voltage, input power of the working coil 12 at the corresponding operation frequency can be calculated (S170).

In some implementations, the controller 190 can read data corresponding to input power from a look-up table for storing data of the input power based on the operation frequency depending on arrangement between the coils 12 and 15.

For example, the corresponding data can be read from data of the look-up table including input power at the operation frequency and a value of the resonance current based on whether the coils 12 and 15 is in constancy or eccentricity.

The data can be shown in the following table.

TABLE 1

| Eccentricity degree (mm) | Input power 44 kHz | Resonance current 44 kHz | Input voltage |
|---|---|---|---|
| 0 | 400 | 603 | 253 |
| 10 | 415 | 627 | 253 |
| 15 | 432 | 645 | 253 |
| 20 | 454 | 671 | 253 |
| 25 | 177 | 704 | 253 |

Although Table 1 shows an example of a value when an operation frequency is 44 kHz, such data can be set and stored every operation frequency.

In some implementations, in the case of a corresponding small home appliance, a target of wireless power transfer can be standardized as a specific small home appliance, and inductance of the reception coil 15 of the small home appliance and combined inductance of the working coil 12 can be pre-calculated and can be configured in the form of a table.

As shown in Table 1 above, when an eccentricity degree is 0, that is, when coils are positioned in constancy, the controller 190 can compare a calculated value of input power of the corresponding working coil 12 with an input power value in the table (S170).

When the calculated value of input power of the working coil 12 is greater than the input power value in constancy, the controller 190 can determine that the target object, that is, a small home appliance having the reception coil 15 is not positioned at constancy (S180).

In some implementations, the controller 190 can read data of eccentricity from the look-up table, that is, can search for an eccentricity value having the same resonance current and the same operation frequency value as in the case of the calculated value of input current among values of the eccentricity degree, which are not 0.

For example, whether an eccentricity value having the same input power value and the same resonance current as the calculated value of input power at the current operation frequency is present can be checked.

For example, when the values correspond to data when eccentricity is 10 mm, the eccentricity degree can be determined to be present by 10 mm and eccentricity can be compensated for (S230).

When there is no value matched with the data on the look-up table, for example, when there is no eccentricity value having the calculated value of input power and the resonance current value at the corresponding operation frequency that are not simultaneously matched with the data, a foreign object can be determined to be present (S190).

When determining that there is a foreign object, the controller 190 can provide an alarm to a user and can guide removal of the foreign object (S200).

When the calculated input power of the working coil 12 is smaller than a constancy value, coils can be determined to be positioned at constancy, and a subsequent operation can be performed.

In some implementations, the controller 190 can determine whether the internal load 23 of the target object 1 begins to be driven by transmitted power while normally transmitting power (S210).

When the internal load 23 of the small home appliance that is the target object 1 receives sufficient reception power, the reception power can be converted and load driving entry can be performed to operate a functional block of the internal load 23, such as an oven toaster or a blender (S220).

When determining that eccentricity occurs, the controller 190 can compensate for eccentricity (S230).

When eccentricity occurs, an operation frequency for achieving generally desired output power at eccentricity may be reduced. For example, as eccentricity becomes serious, a coupling factor among wireless power transmission parameters may be reduced, thereby reducing power transmission efficiency. Thus, power transmitted during an operation at the same operation frequency may be highly reduced. Thus, a long time may be taken to achieve desired output power.

Thus, when power is wirelessly transmitted to a wireless small home appliance that needs a rapid response, it may not be possible to embody desired performance using such a long response.

In some implementations, an eccentricity degree can be calculated, and thus, in order to compensate for such output power based on the calculated degree, the apparatus can be controlled to vary an operation frequency and to transmit power.

Figure 10:
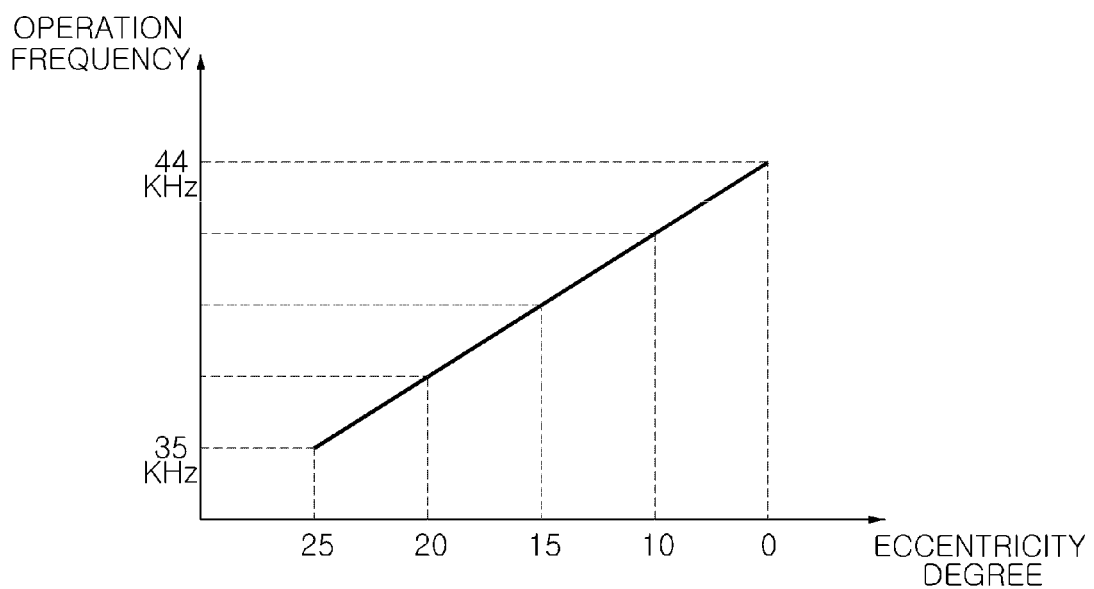
FIG. 10 is a graph illustrating a compensation method based on eccentricity.

For example, as shown in FIG. 10, an operation frequency for wireless power transfer can be varied and set depending on an eccentricity degree.

By way of further example, an operation frequency required to transmit the same requested power can be different depending on an eccentricity degree, and if the eccentricity degree is increased, the operation frequency is lowered.

Thus, an operation frequency can be set to be varied depending on an eccentricity degree, and as shown in FIG. 10, when the eccentricity degree is 0, the operation frequency can be set to 44 kHz, and when the eccentricity degree is 25 mm, the operation frequency can be set to 35 kHz.

Such a relationship between the eccentricity degree and the operation frequency can be set and stored with respect to each eccentricity degree in the look-up table, and can be stored as a functional relation as shown in FIG. 10.

Thus, as an eccentricity degree is increased, an operation frequency is lowered, and thus, a time taken to enter the last lowest operation frequency can be reduced.

As such, the eccentricity degree can be calculated, and thus, a start frequency can be controlled during wireless power transfer to effectively transmit requested power for a short time.

Thus, the present disclosure can provide a wireless power transmission apparatus for transmitting power within a short time by ensuring power transmission efficiency even if eccentricity occurs by a predetermined degree.

As described above, in a normal operation mode, input power of the working coil 15 can be calculated in real time and can be compared with the requested power from the target object 1, and thus, whether eccentricity occurs and whether a foreign object is present can be determined, and it can be possible to transmit power at an operation frequency to which the eccentricity degree is applied.

Through the above solution, the multi-functional wireless power transmission device using one working coil can determine whether eccentricity occurs in a target object, can compensate for this, and can perform wireless power transfer (WPT) in the wireless power transmission mode while selectively driving the wireless power transmission mode or the induction heating mode.

Even if information is not received from a positioned target small home appliance when user mode selection is a wireless power transmission mode, whether eccentricity occurs can be determined, and thus, it can be possible to compensate for eccentricity prior to power transfer.

As such, the present disclosure can provide a wireless power transmission apparatus for providing an alarm to a user during wireless power transfer when a wireless power transmission mode is selected, if a target object is a small home appliance having a reception coil and excessive eccentricity occurs between the corresponding reception coil and a working coil of a transmission side. In this case, whether a foreign object is present as well as whether eccentricity occurs can be determined, and thus, a user alarm can also be provided.

In addition, when wireless power transfer is performed depending on an eccentricity degree, a start frequency of frequency sweep can be controlled or a sweep interval can be controlled, and thus, wireless power transfer to which an eccentricity degree is applied can be performed, thereby enhancing power transmission efficiency.

What is claimed is:

1. A wireless power transmission apparatus for induction heating comprising:
   a working coil configured to change operation based on selection of a mode of operation from among a plurality of operating modes, the plurality of operating modes including a wireless power transmission mode configured to wirelessly transmit power and a heating mode configured to heat one or more objects;
   an inverter configured to output, to the working coil, current at an operation frequency; and
   a controller configured to:
      calculate an eccentricity degree between the working coil and a reception coil of a target object,
      control, in the wireless power transmission mode, the operation frequency based on the calculated eccentricity degree while performing wireless power transmission to the target object,
      receive, from the target object, information regarding requested power while the operation frequency is set to a first operation frequency,
      calculate input power of the working coil in response to the requested power,
      calculate an input voltage to be set in the working coil based on the requested power,
      based on a standby voltage being greater than or equal to the calculated input voltage, increase the calculated input voltage to match the standby voltage, and
      based on the standby voltage being less than the calculated input voltage, decrease the calculated input voltage to match the standby voltage,
   wherein the standby voltage with predetermined amplitude is maintained in the working coil based on the operation frequency being the first operation frequency.

2. The wireless power transmission apparatus of claim 1, wherein the controller operates in a preparation period prior to a normal wireless power transmission mode configured to perform the wireless power transmission to the target object, and
   wherein a determination of whether the target object includes the reception coil is made in the preparation period.

3. The wireless power transmission apparatus of claim 2, further comprising:
   an upper glass arranged to receive the target object; and
   an input unit configured to receive the selection of the mode of operation.

4. The wireless power transmission apparatus of claim 1, wherein the controller is configured to store data of input power and resonance current of the working coil based on an operation frequency of the inverter with respect to the eccentricity degree.

5. The wireless power transmission apparatus of claim 4, wherein the controller is configured to:
   compare the stored data of input power with the calculated input power, and
   determine whether the working coil and the reception coil are aligned based on the comparison.

6. The wireless power transmission apparatus of claim 5, wherein, based on the coils being determined misaligned, the controller is configured to determine whether there is an eccentricity degree having values of resonance current and input power at the operation frequency, which are matched with the calculated input power among stored data of eccentricity.

7. The wireless power transmission apparatus of claim 6, wherein, based on the calculated input power and the stored data of eccentricity being different, the controller is configured to determine that a foreign object is present in the working coil.

8. The wireless power transmission apparatus of claim 6, wherein, based on the eccentricity degree increasing, the operation frequency is lowered during the wireless power transmission.

9. A method of operating a wireless power transmission apparatus for induction heating, which includes a working coil configured to change operation based on selection of a mode of operation from among a plurality of operating modes, the plurality of operating modes including a wireless power transmission mode configured to wirelessly transmit power and a heating mode configured to heat one or more objects, the method comprising:
 checking whether the wireless power transmission mode is selected;
 a preparation operation including:
  detecting a target object,
  determining whether the target object includes a reception coil, and
  determining whether the target object includes the reception coil based on input current or resonance current; and
 a normal operation mode operation including:
  calculating an eccentricity degree between the working coil and the reception coil of the target object,
  controlling, based on the wireless power transmission mode being selected, an operation frequency of an inverter for wireless power transmission depending on the calculated eccentricity degree,
  receiving, from the target object, information regarding requested power while the operation frequency is set to a first operation frequency, and
  calculating input power of the working coil in response to the requested power,
 wherein a standby voltage with predetermined amplitude is maintained in the working coil based on the operation frequency being the first operation frequency,
 wherein calculating the input power includes:
  calculating an input voltage to be set in the working coil based on the requested power,
  based on the standby voltage being greater than or equal to the calculated input voltage, increasing the calculated input voltage to match the standby voltage, and
  based on the standby voltage being less than the calculated input voltage, decreasing the calculated input voltage to match the standby voltage.

10. The method of claim 9, further comprising:
 determining whether eccentricity occurs based on data of input power of the working coil and resonance current at an operation frequency of the inverter with respect to the eccentricity degree.

11. The method of claim 10, wherein determining the eccentricity degree includes:
 comparing data of input power with calculated input power, and
 determining whether the working coil and the reception coil are aligned based on the comparison.

12. The method of claim 11, wherein determining the eccentricity degree includes:
 based on the coils being determined misaligned, determining whether there is an eccentricity degree having values of resonance current and input power at the operation frequency, which are matched with the calculated input power among data of eccentricity.

13. The method of claim 12, further comprising: based on the calculated input power and the data of eccentricity being different, determining that a foreign object is present in the working coil.

14. The method of claim 12, wherein, based on the eccentricity degree increasing, the operation frequency is lowered during the wireless power transmission.

15. The method of claim 14, wherein the data of eccentricity is read from a look-up table and is compared with the calculated input data.

\* \* \* \* \*